July 11, 1967  R. M. AKERS  3,329,984
LOADING DOCK RAMP ASSEMBLY
Filed Dec. 10, 1965  2 Sheets-Sheet 2

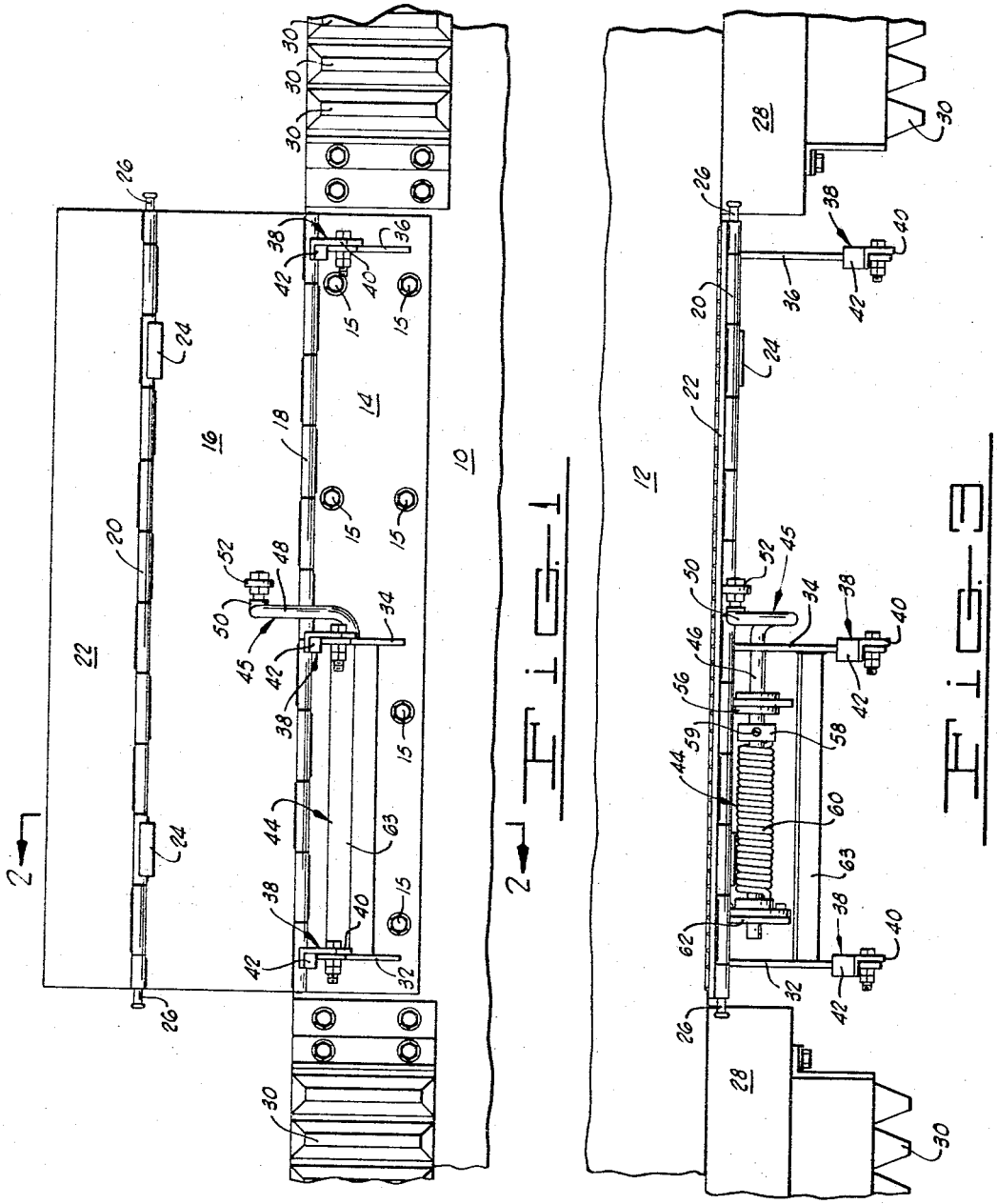

INVENTOR.
ROBERT M. AKERS
BY
Dunlap and Laney
ATTORNEYS ated July 11, 1967

3,329,984
LOADING DOCK RAMP ASSEMBLY
Robert M. Akers, 1300 S. Robinson,
Oklahoma City, Okla. 73125
Filed Dec. 10, 1965, Ser. No. 513,024
5 Claims. (Cl. 14—71)

ABSTRACT OF THE DISCLOSURE

A ramp assembly for use on he front of a loading dock and form a ramp between the dock and a truck being loaded or unloaded. The ramp comprises a bridge plate hinged to the edge of the dock and biased upwardly by a torsion spring assembly to reduce the lift required in raising the bridge plate up when a truck is being backed into loading position. The assembly also includes an auxiliary plate hinged to the front edge of the bridge plate for extending the length of the ramp assembly, and adjustable stops on the front of the dock for leveling the bridge plate with the bed of a truck being loaded.

This invention relates to a loading dock ramp assembly of the type used for transferring materials or cargo between a stationary platform or building, and a truck or other vehicle which is backed up to the building at the loading dock. More particularly, the invention relates to a loading dock ramp assembly which can be utilized to provide a selectively positioned bridiging structure between the bed of a truck, and a stationary horizontal loading dock surface so that materials may be transferred between the loading dock and truck by sliding or on dollies with a minimum of physical manipulation and difficulty being encountered during such transfer.

In transferring cargo from a truck or other cargo carrying vehicle to a stationary loading dock in a warehouse or the like, the positioning of the truck with respect to the platform or surface which is to receive the cargo can frequently be accomplished only in a way which provides either a gap between the bed of the truck and the loading dock, or an abrupt vertical dropoff between the truck bed and the dock wich makes transfer of the cargo difficult and more time consuming. The present invention provides an improved loading dock ramp assembly which enhances the ease with which cargo can be transferred from trucks of varying sizes and shapes to a loading dock. The structure is versatile in its usage in that, despite the horizontal spacing or the vertical offset of the truck bed with respect to the cargo receiving surface of the dock, the hinged plate or plates forming important elements in the loading dock structure provide a smooth surface of relatively slight or no inclination to the horizontal over which the cargo can be slid or dollies can be rolled with a minimum of bumping or jarring, and with a minimum of physical exertion required.

Broadly described, the present invention comprises a base plate formed of a rigid material and having at least one substantially linear edge; means for securing the base plate to a vertical surface, such as the vertical wall of a warehouse adjacent a loading dock and a cargo supporting bridge plate pivotally connected to one of the linear edges of the base plate for pivotation with respect to the base plate so that the two plates can be positioned in substantially coplanar alignment, or can be pivoted relative to each other so as to occupy planes extending substantially at a right angle to each other. The loading dock apparatus of the invention further includes resilient biasing means which is mounted on one of the two plates, and which cooperates with the other plate so as to resiliently urge the bridge plate to a position of coplanar alignment with the base plate. By this means, the bridge plate can be retracted to an inoperative, out-of-the-way position when the loading dock assembly is not in use. The assembly further includes stop means which are positioned on one of the plates for arresting the pivotal movement of the bridge plate with respect to the base plate when the bridge plate extends at a selected angle (which will usually approximate 90°) from one side of the base plate. Finally, at least one resilient vehicle bumper element is incorporated in the ramp assembly and extends outwardly from the plane occupied by the base plate, and in the same direction of extention with respect thereto as the direction of extension of the bridge plate when the bridge plate extends at the selected angle to which reference has been made.

With the described loading dock assembly, the base plate may be easily mounted on a vertical wall or other vertical surface adjacent the horizontal loading dock surface which is to receive, or from which is to be transferred, a particular cargo or quantity of material from a vehicle parked adjacent the loading dock. When the base plate is thus mounted, the bridge plate can be pivoted to a retracted, out-of-the-way position in which it is in coplanar alignment with the base plate, or the bridge plate may be pivoted outwardly and downwardly to a generally horizontally extending position so as to bridge across the gap between the bed of the cargo carrying vehicle and the horizontal surface of the loading dock. The relative size of the bridge plate and the resilient vehicle bumper elements are such that the bridge plate will span the distance between the bed of the truck and the loading dock receiving surface, despite the type or size of the cargo carrying vehicle in use. Moreover, the stop means which is provided for arresting the pivotal movement of the bridge plate with respect to the base plate is, in a preferred embodiment of the invention, adjustable so that the inclination of the bridge plate with respect to the horizontal can be varied to accommodate the structure to truck beds of varying vertical heights from the ground.

In a preferred embodiment of the invention, the structure includes, in addition to those elements which have been described, an auxiliary plate which is pivotally connected to the bridge plate at one longitudinal edge thereof and along a pivotal axis which extends substantially parallel to the pivotal axis which interconnects the base plate and the bridge plate. The use of the auxiliary plate in addition to the bridge plate permits the assembly to be effectively utilized despite even greater differences in the vertical height of the loading dock platform and truck bed with respect to each other. The auxiliary plate also permits the horizontal reach of the assembly to be extended so that the truck may be parked further from the loading dock, and the greater distance or gap thus created between the truck and the dock easily spanned by the combination of the bridge plate and auxiliary plate.

It should also be pointed out that in the preferred construction of the invention, the resilient biasing means which is employed for retracting the bridge plate constitutes a torque spring mechanism which is mounted on the base plate. This mechanism includes a crank arm which is resiliently biased by a torque spring to an upwardly extending position, and which rotatably journals at its upper end, a roller which bears against the underside of the bridge plate and urges the bridge plate to a position in substantially coplanar alignment with the base plate. The selection of the torque spring is such that, as the bridge plate is pivoted downwardly toward a horizontal plane by manually applied force, the weight of the bridge plate will overcome the resilient bias of the torque spring soon after the bridge plate is moved out of the vertical plane, and the bridge plate will then continue to automatically descend to the horizontal position by reason of its own weight. When the bridge plate is to be retracted to the vertically extending inoperative position, the torque spring assembly reduces the total load which must be initially lifted toward manually, and then automatically completes the retraction of the bridge plate to the vertically extending status after this element has pivoted upwardly to the point where the biasing influence of the spring overcomes the gravitational force component acting downwardly on the bridge plate.

From the foregoing description of the invention, it will have become apparent that an important object of the invention is to provide an improved loading dock ramp assembly which is adaptable to use under various loading and unloading conditions, yet is of relatively simple and inexpensive construction.

A more specific object of the invention is to provide a loading dock ramp assembly which provides a sturdy load supporting surface which, in use, bridges the gap between truck beds of varying heights and the surface of the loading dock and which, when not in use, is retained in a retracted position alongside the vertically extending wall of the warehouse or loading dock.

Another object of the invention is to provide a loading dock assembly which includes a ramp or apron structure which may be varied in its inclination with respect to the horizontal, as well as in the horizontal distance which it extends, so that it can be used for loading and unloading trucks and other vehicles having cargo supporting beds or platforms of varying height with respect to the ground, and disposed varying distances from a loading dock.

An additional object of the invention is to provide a mechanically simple, ruggedly constructed loading dock assembly which is characterized in having a long and trouble-free operating life despite abusive conditions of use and the imposition thereon of a considerable amount of mechanical stress and strain during such use.

In addition to the foregoing described objects and advantages, additional objects and advantages will become apparent as the following detailed description of the invention is read in conjunction with the accompanying drawings which illustrate the invention.

In the drawings:

FIGURE 1 is a view in elevation of one embodiment of the loading dock ramp assembly of the invention as the assembly appears when mounted on a loading dock with its bridge plate and auxiliary plate in their retracted, upwardly extending position.

FIGURE 3 is a plan view of the loading dock ramp assembly with the bridge plate and auxiliary plate in the retracted position illustrated in FIGURE 1.

Figure 2:
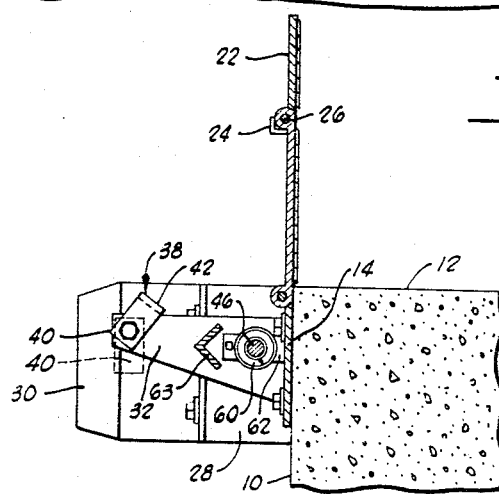
FIGURE 2 is a sectional view taken along line 2—2 of FIGURE 1.

Referring now to the drawings in detail and particularly to FIGURES 1 and 2, the loading dock ramp assembly of the invention is adapted to be mounted on a vertically extending wall or abutment 10 which is adjacent the horizontal platform or surface 12 forming the cargo receiving portion of the loading dock. The loading dock ramp assembly of the invention includes a base plate 14 which, in the illustrated embodiment, is generally rectangular in configuration and is mounted or secured on the wall 10 by a plurality of bolts 15 or other suitable securing members.

The upper longitudinal edge of the base plate 14 is flush with the upper edge of the wall 10 and is connected to a generally rectangular bridge plate 16 by a suitable hinge connection, such as the piano hinge structure 18. The bridge plate 16 can thus pivot between a first position in which it is in substantially coplanar vertical alignment with the base plate 14 and a second position in which it extends substantially normal to the base plate or, stated differently, extends in a substantially horizontal plane.

Pivotally connected to the upper longitudinal edge of the bridge plate 16 through a suitable hinge structure 20 is an auxiliary plate 22. A pair of positive stops 24 are secured to the hinge structure 20 to prevent the auxiliary plate 22 from pivoting downwardly about its pivotal axis through an angle of more than about 90–110°. In a preferred construction of the invention, the hinge structure 20 is sufficiently stiff or non-yielding that the auxiliary plate 22 will maintain its position relative to the bridge plate 16 until it is forcibly moved by manual effort to another position. The pintle pin 26 of the hinge structure 20 is extended beyond the ends of the bridge plate 16 and auxiliary plate 22 to provide a protuberance which can be engaged by a hook or other implement which can be used to manually raise the bridge plate 16 and auxiliary plate 22 to their retracted positions illustrated in FIGURE 1. The method of retraction of these plates will be explained in greater detail hereinafter.

Horizontally spaced from each other along the wall 10 and located adjacent opposite ends of the base plate 14 are a pair of bumper blocks 28. If desired, the assembly may be constructed as an integrated combination by extending the base plate beyond the ends of the bridge plate and mounting the bumper blocks 28 thereon. The bumper blocks 28 each carry a plurality of resilient vehicle bumper elements 30 which project therefrom in a horizontal direction, and provide a fender or guard structure which protects the loading dock and the assembly of the present invention from a truck or other vehicle which is backed in the direction of the dock.

Figure 4:
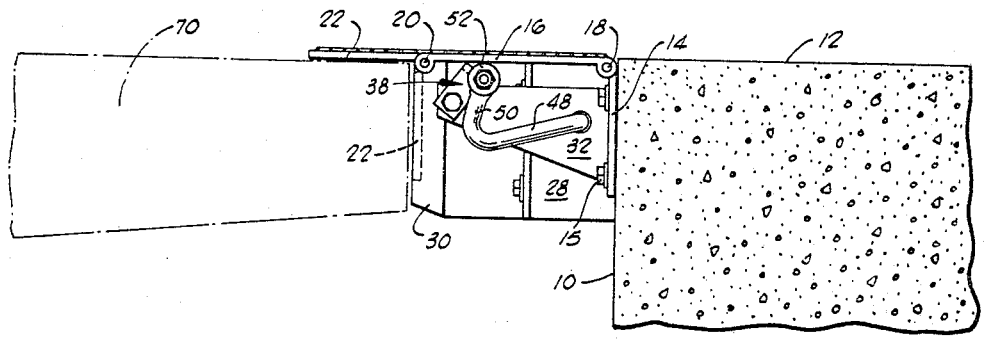
FIGURE 4 is a view in elevation showing the loading dock ramp assembly as it appears when viewed from one end thereof with one of the bridge plate supporting brackets removed, and illustrating in phantom, a truck bed, and also an alternate position of the auxiliary plate forming a part of this embodiment of the assembly.

Secured to the base plate 14 in horizontally spaced relation therealong are a plurality of supporting brackets 32, 34 and 36. The supporting brackets 32, 34 and 36 extend outwardly in a horizontal direction from the base plate 14 and are of generally trapezoidal configuration, as best illustrated in FIGURES 2 and 4. Adjacent the outer or free end of each of the supporting brackets 32, 34 and 36, an angle adjusting stop member 38 is pivotally secured to each of the respective support brackets and includes a vertically extending leg 40 and a horizontal support tab 42 connected at a right angle to the vertical leg. The function of the pivotally mounted stop members 38 in adjusting the angle at which the base plate 16 extends with respect to the horizontal will be hereinafter described in greater detail.

For the purpose of retaining the bridge plate 16 and auxiliary plate 22 in their upwardly extending, retracted positions when they are not in use, a torsion spring mechanism designated generally by reference character 44 is employed. The torsion mechanism 44 includes a crank arm 45 which is bent to the configuration best illustrated in FIGURES 1–3. The crank arm 45 thus includes a horizontally extending shaft portion 46, an upwardly extending portion 48 secured to the shaft portion at a right angle, and a horizontal roller supporting portion 50. A suitable roller 52 is journaled on the end of the horizontal roller supporting portion 50 and bears against the bridge plate 16.

The horizontal shaft portion 46 of the crank arm 45 passes through a suitable aperture in the central supporting bracket 34 and through a bearing block 56 which is mounted by any suitable means on the base plate 14. A spring retainer collar 58 is keyed by a set screw 59 or other suitable means to the horizontal shaft portion 46 of the crank arm for rotation therewith and is connected to one end of a helical torsion spring 60. The other end of the helical torsion spring is secured to a bearing block 62 which rotatably journals the horizontal shaft portion 46 of the crank arm and is mounted on the base plate 14. The described construction permits the helical torsion spring 60 to be resiliently deformed by the rotation of the crank arm 45 about the longitudinal axis of its horizontal shaft portion 46 with the resilient loading of the spring occurring so as to oppose the downward movement of the bridge plate 16. A large angle iron protector plate 63 is secured between the support brackets 32 and 34 and in horizontal alignment with the torsion spring mechanism 44 to protect the spring mechanism from being damaged as a result of inadvertent contact with vehicles or other objects which may move in a horizontal direction toward the loading dock.

*Operation*

In the operation of the loading dock ramp assembly of the invention, a vehicle such as a railroad flatcar or truck is brought adjacent the loading dock preparatory to transferring cargo from the dock to the vehicle or vice versa. As illustrated by dashed lines in FIGURE 4 of the drawings, a truck has been backed toward the loading dock until the bed 70 thereof abuts the vehicle bumper elements 30. With the vehicle to be loaded or unloaded thus positioned, the movable portion of the loading dock ramp assembly of the invention, which includes the bridge plate 16 and the auxiliary plate 22, is manually pivoted downwardly from its retracted position, as illustrated in FIGURE 1, toward its generally horizontally position illustrated in FIGURE 4.

After moving downwardly past a certain point in this pivotal movement, the weight of the bridge plate 16 and auxiliary plate 22 becomes sufficiently great to overcome the upwardly biasing influence of the torsion spring assembly 44, and the plates will fall the rest of the way to their horizontal position under the influence of gravity. The downward movement of the bridge plate 16 is arrested by contact with the stop members 38, or, in some instances, with the upper surface of the supporting brackets 32, 34 and 36 which carry the stop members. The inclusion of the stop members in the assembly imparts greater versatility to the use of the apparatus. Thus, the stop members may occupy one of two positions, depending upon the angle of inclination of the plates 16 and 22 with the horizontal which may be desired. These alternate positions of the stop members 38 are illustrated in FIGURE 2. When the stop members 38 are in the positions illustrated in FIGURE 4, the bridge plate 16 is arrested in a substantially horizontal position, and is aligned in a common horizontal plane with the horizontal surface 12 of the loading dock and the cargo supporting surface of the truck bed 70. This status of the stop members 38 is also depicted by the full line illustration of them in FIGURE 2.

In the second or alternate position of the stop members 38 in which they are pivoted downwardly to leave the upper edges of the supporting brackets 32, 34 and 36 exposed to contact with the bridge plate 16 (as illustrated in dashed lines in FIGURE 2), the bridge plate will incline downwardly at a slight angle from its pivotal axis and can be used more effectively where the truck bed is at a lower level than the surface 12 of the loading dock.

It will be noted in referring to FIGURE 4 that the auxiliary plate 22 rests in part upon the truck bed 70 and forms with the bridge plate 16, a continuous ramp or platform extending between the truck bed and the cargo supporting surface 12 of the loading dock. With the apparatus in this position, cargo may be easily transferred between the truck bed and the loading dock either by means of dollies, or by sliding, or by manually lifting the cargo and carrying it bodily across the auxiliary plate 22 and bridge plate 16.

In some instances, it may be desirable, because of the manner in which the truck is loaded, or for other reasons, to fold the auxiliary plate 22 downwardly to the position illustrated in dashed lines in FIGURE 4 rather than to extend this plate in a common, substantially horizontal plane with the bridge plate 16. This relationship is easily accomplished through the use of the hinged structure 20. In the preferred construction, the hinge structure 20 is sufficiently tight that it will maintain the auxiliary plate 22 in any position relative to the bridge plate 16 to which the former plate is moved.

Figure 5:
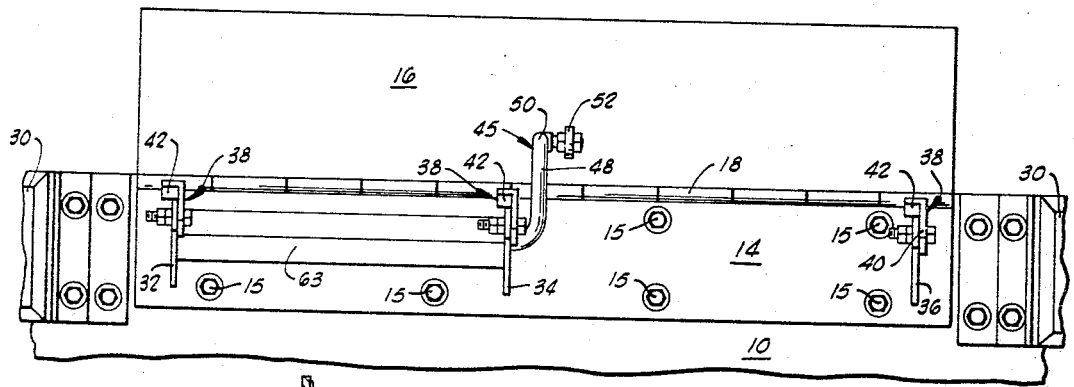
FIGURE 5 is a view in elevation similar to FIGURE 1 illustrating an alternate embodiment of the invention.

An alternative embodiment of the invention is illustrated in FIGURE 5 of the drawings. This embodiment is similar in many respects to the embodiment illustrated in FIGURES 1–4 and, for that reason, identical reference numerals have been utilized to identify those common parts which appear in both embodiments. The only significant difference between the embodiment illustrated in FIGURE 5 of the drawings and that which is illustrated in FIGURES 1–4 is the omission from the former embodiment of the auxiliary plate 22 and the hinge structure 20 which connects it to the bridge plate 16. This embodiment of the invention is, of course, more economical in construction and is suited to use with small vehicles, such as pickup trucks or the like, where power fork lifts and heavy dollies are not required to transfer cargo from the vehicle to the dock. In this instance, the bridge plate 16 is merely lowered to a substantially horizontal position where it rests upon the stop members 38 or upon the brackets 32, 34 and 36, and the vehicle is backed up until its rear end bears against the bumper elements 30. By making the bridge plate 16 of a size such that its longitudinal edge extending parallel to, and spaced from, the hinge 18 terminates in line with the bumper elements 30, this plate will then span the horizontal distance to the truck bed and will support the cargo or personnel carrying cargo as they move from the truck to the loading dock.

Although certain preferred embodiments of the invention have been herein described in order to provide examples which will enable one skilled in the art to practice the invention, it is to be understood that various modifications and changes can be made in the depicted and described structure without departure from the basic principles which underlie the invention. All such changes and modifications are deemed to be circumscribed by the spirit and scope of the invention except as the same may be necessarily limited by the appended claims or reasonable equivalents thereof.

What is claimed is:
1. A loading dock ramp assembly comprising
 a generally rectangular base plate;
 a generally rectangular bridge plate;
 a hinge pivotally interconnecting said base plate and said bridge plate at longitudinal edges thereof;
 a crank arm rotatably mounted on one side of said base plate for rotation about an axis extending parallel to the longitudinal edge of said base plate which is connected by said hinge to said bridge plate, said crank arm including an elongated horizontally extending shaft portion and a second portion extending at an angle to said shaft portion into proximity to one side of said bridge plate;
 a roller carried by said second portion of said crank arm and bearing against said one side of said bridge plate;
 a torsion spring connected between said base plate and the elongated shaft portion of said crank arm and resiliently biasing said crank arm in rotation in a direction to align said base plate and bridge plate in a common plane;
 a plurality of horizontally spaced supporting brackets secured to said one side of said base plate and extending normal to said base plate, said supporting brackets having upper surfaces occupying a common plane extending substantially normal to said base plate and intersecting said base plate in a line extending parallel to, and adjacent, the longitudinal edge of said base plate connected by said hinge to said bridge plate, and said supporting brackets each having a free end spaced from said base plate; and L-shaped angle adjusting stop members pivotally connected to each of said supporting brackets at its free end, said L-shaped stop members each being pivotally movable between two angle adjusting positions for varying the angle at which said bridge plate extends to said base plate when said bridge plate is pivoted about said hinge against the resilient bias of said torsion spring.

2. A loading dock ramp assembly comprising:

a base plate having at least one substantially linear edge;

means for securing the base plate to a vertical surface;

a cargo supporting bridge plate pivotally connected to said one linear edge of said base plate;

resilient biasing means mounted on one of said plates and cooperating with the other of said plates to resiliently bias said base plate and bridge plate to positions of coplanar alignment with each other, comprising:

a crank arm having a shaft portion rotatably mounted in bearing blocks on one of said plates; and a remaining portion bent at an angle to said shaft portion and extending into contact with the other of said plate; and a torsion spring around the shaft portion of said crank arm and having one of its ends keyed to, and movable in rotation with, said shaft portion, and its other end connected to said one plate whereby said torsion spring is resiliently deformed by rotation of said shaft portion;

stop means on one of said plates for arresting the pivotal movement of said plates relative to each other when said plates extend at a selected angle with respect to each other; and at least one vehicle bumper extending outwardly from the plane occupied by said base plate in a direction substantially normal to said plane and on the same side of said plane on which said resilient biasing means is located.

3. A loading dock ramp assembly as claimed in claim 2 and further characterized to include an auxiliary plate pivotally connected to said bridge plate for pivotation about a pivotal axis extending substantially parallel to the pivotal axis of said bridge plate on said base plate.

4. A loading dock ramp assembly as claimed in claim 2 wherein said auxiliary plate is hingedly connected to said bridge plate along an elongated pivotal axis, said hinge connection including a hinge pin projecting beyond the ends of said plates and providing an engageable protuberance for lifting said bridge plate and auxiliary plate from a horizontally extending position to a vertically extending position by pivoting said bridge plate about it pivotal axis with respect to said base plate.

5. A loading dock ramp assembly comprising:

a base plate having at least one substantially linear edge;

means for securing the base plate to a vertical surface with the linear edge of the base plate at the top of the base plate and extending substantially horizontally;

a cargo supporting bridge plate pivotally connected to said one linear edge of the base plate;

crank arm means; including torsion means, carried by the base plate and engaging the bridge plate biasing the bridge plate upwardly toward coplanar alignment with the base plate;

stop means on the base plate for arresting the pivotal movement of said plates relative to each other when said plates extend at a selected angle with respect to each other; and at least one vehicle bumper extending outwardly from the plane occupied by the base plate in a direction substantially normal to the base plate and on the same side of said plane on which the crank arm means is located.

References Cited

UNITED STATES PATENTS 3,087,178   4/1963   Loomis   14—71
3,137,876   6/1964   Loomis   14—71

FOREIGN PATENTS 236,296   10/1964   Austria.

EVON C. BLUNK, *Primary Examiner.*

H. C. HORNSBY, *Assistant Examiner.*